March 7, 1944.   E. W. MILLER   2,343,567
METHOD OF CROWNING GEARS BY SHAVING
Original Filed June 19, 1936   3 Sheets-Sheet 2

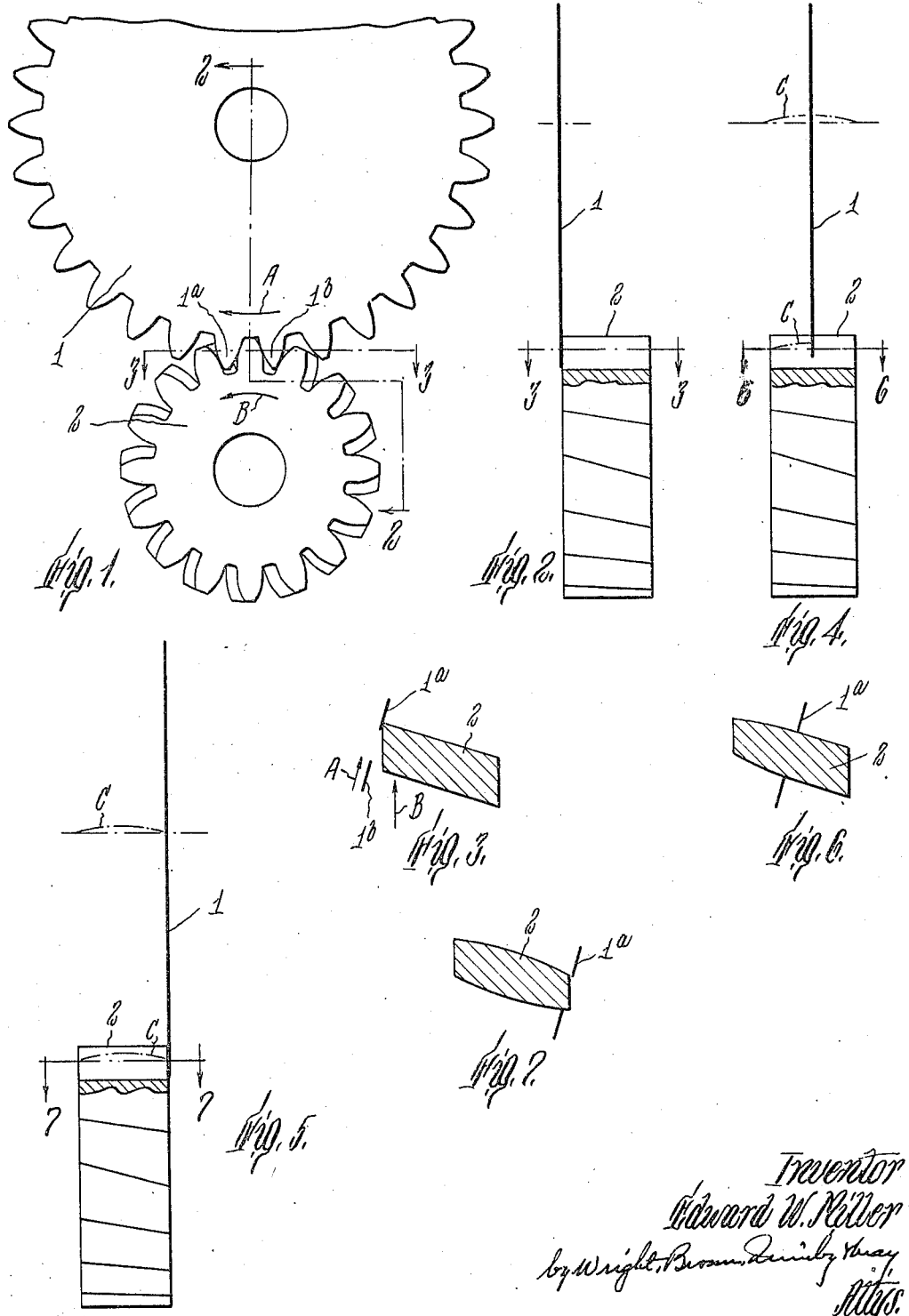

Inventor
Edward W. Miller
by Wright, Brown,
Quinby & May
Attys.

March 7, 1944.     E. W. MILLER     2,343,567
METHOD OF CROWNING GEARS BY SHAVING
Original Filed June 19, 1936     3 Sheets-Sheet 3

Inventor
Edward W. Miller
by Wright, Brown, Quinby & May
Attys.

Patented Mar. 7, 1944

2,343,567

UNITED STATES PATENT OFFICE 2,343,567

METHOD OF CROWNING GEARS BY SHAVING

Edward W. Miller, Springfield, Vt., assignor to The Fellows Gear Shaper Company, Springfield, Vt., a corporation of Vermont Original application June 19, 1936, Serial No. 86,089, now Patent No. 2,280,045, dated April 14, 1942. Divided and this application December 9, 1940, Serial No. 369,161

8 Claims. (Cl. 90—1.6)

In finishing gears by the method commercially known as shaving, a cutting tool is used having teeth in the form of gear teeth conjugate to the gear to be finished, and the sides of which are intersected by grooves or gashes extending between the crests and roots of the teeth in planes more or less nearly perpendicular to the length of the teeth in the axial direction of the tool. The intersections of such grooves with the sides of the teeth form cutting edges. When such a tool is run in mesh with the work gear and at the same time a relative translative movement or slip is caused to occur between the contacting teeth lengthwise of the gear teeth, a cutting action is performed by the before mentioned edges. The lands, or unrelieved portions of the tool tooth faces between the cutting edges, control the cutter in its mesh with the work gear, so that the surfaces of the work gear teeth are cut away to shallow depth and such teeth are rapidly brought to exact predetermined form and dimensions.

It is frequently desirable to finish gear teeth with a crowning effect; that is, with somewhat less thickness at the ends of the gear than in mid length and with a gradual change of thickness between the thickest and thinnest portions. It is also desirable, in the interest of both accuracy and economy, to crown the gear teeth in the manner described while being shaved, and by effecting a relative approach and recession between the tool and the work in the course of a relative feed movement axially of the work. When the motion which produces the crowning effect is performed in this way it is possible to support both tool and work piece more rigidly than in any other way and to obtain superior effects of accuracy and smooth finish.

But when a shaving tool of sufficient axial length for control of its meshing engagement with the work, and of which the teeth are of uniform thickness throughout their length, is used, interference with the work gear teeth occurs, which prevents proper cutting action and formation of the correct desired crowned contours in the work gear teeth.

The invention herein described is a method of finishing gears by which the objections above referred to are avoided and the advantages following from a rectilinear advance and recession between the tool and work piece are retained. This method comprises the employment of a shaving tool having the characteristics disclosed and claimed in my Patents 2,228,965 and 2,228,968 granted January 14, 1941, on applications pending herewith, and the steps of moving such tool and the work piece relatively to one another in the direction of the work gear axis and with a translative displacement of one toward and away from the axis of the other, so that a desired crowned formation of the work gear teeth is accurately produced.

The invention will now be more particularly described with reference to the drawings, in which Fig. 1 is a face view of an ideal shaving tool in mesh with a gear at the commencement of the relative feeding motion;

Fig. 2 is a sectional view of such tool and gear on line 2—2 of Fig. 1;

Fig. 3 is a sectional view on line 3—3 of Fig. 2 on a larger scale showing one tooth of the gear and two contiguous teeth of the tool;

Figs. 4 and 5 are views similar to Fig. 2 showing the further progress of the feeding motion;

Figure 8:
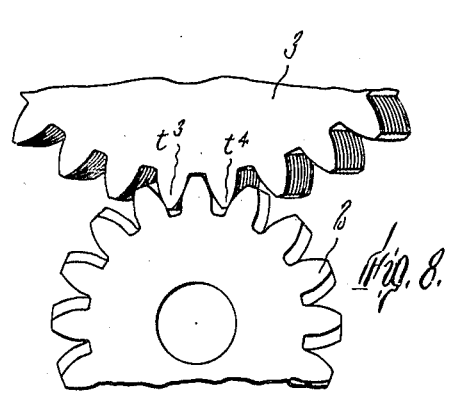
Figure 9:
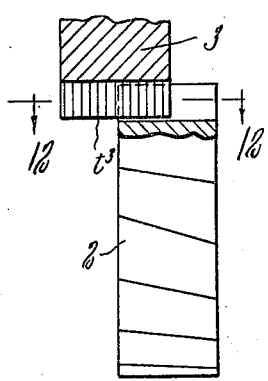
Figure 10:
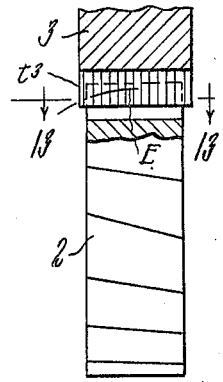
Figure 11:
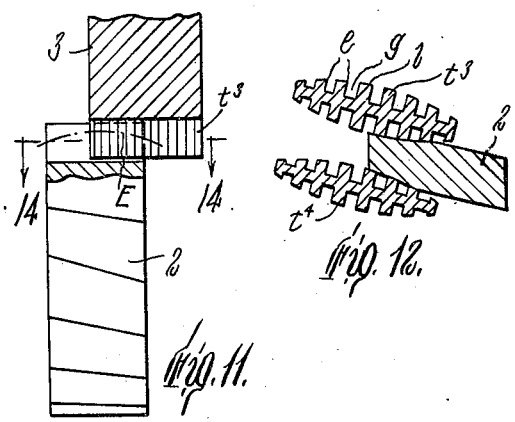
Figure 12:
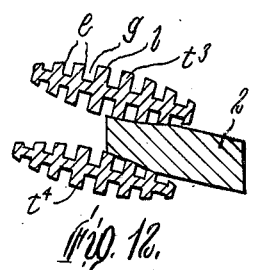
Figure 13:
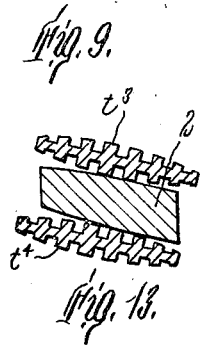
Figure 14:
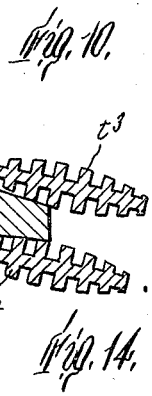
Figure 15:
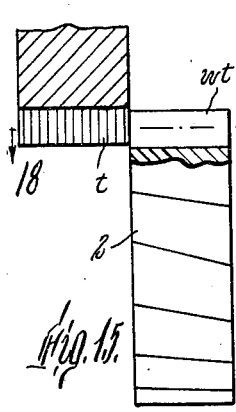
Figure 16:
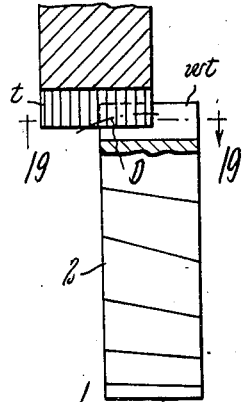
Figure 17:
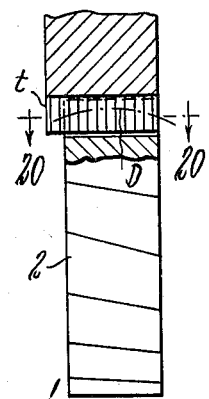
Figure 20:
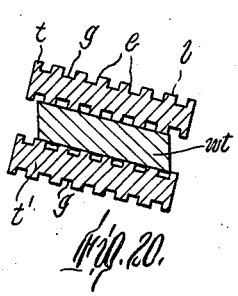
Figure 18:
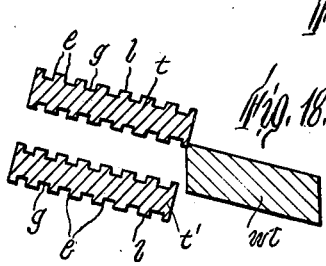
Figure 19:
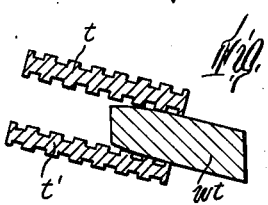
Figure 21:
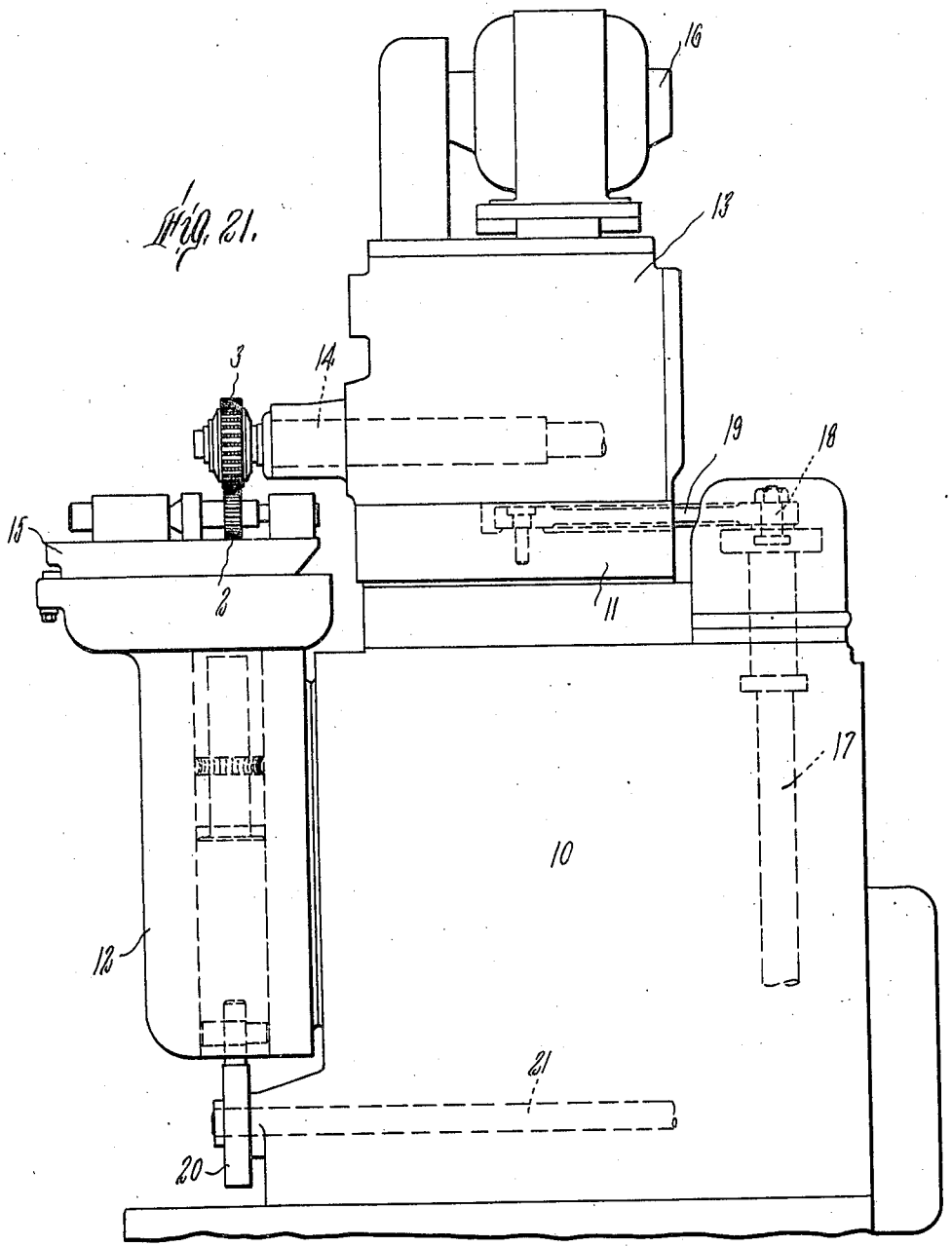
Figure 22:
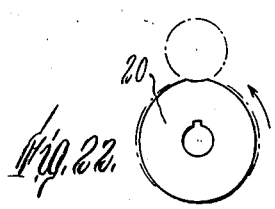

Figs. 6 and 7 are sectional views similar to Fig. 3 taken respectively on line 6—6 of Fig. 4 and line 7—7 of Fig. 5, showing the effect of the tool on the work at the mid stage and end of the feeding movement;

Fig. 8 is a face view of a cutter suitable for carrying out the method and shown in operative association with a work gear;

Fig. 9 is a side view of the cutter and work piece shown in Fig. 8;

Figs. 10 and 11 are views similar to Fig. 9 showing the relative positions of the tool and work piece in successive stages of the performance of the method;

Figs. 12, 13 and 14 are detail sectional views showing a tooth of the work piece and two contiguous teeth of the tool taken respectively on line 12—12 of Fig. 9, line 13—13 of Fig. 10, and line 14—14 of Fig. 11;

Figs. 15, 16 and 17 are views similar to Figs. 2, 4 and 5 respectively showing a standard shaving cutter of the prior art in three successive positions occupied in the attempt to crown gears by shaving;

Figs. 18, 19 and 20 are sections taken respectively on line 18—18 of Fig. 15, 19—19 of Fig. 16 and 20—20 of Fig. 17, illustrating the effects of such an attempt;

Fig. 21 is a side elevation partly in section of a machine suitable for performing the method;

Fig. 22 is a face view of a cam adapted to effect the relative recession and approach between tool and work.

Like reference characters designate the same parts wherever they occur in all the figures.

The principles of crowning gears by a shaving tool are illustrated in Figs. 1–7. The tool here designated by the numeral 1 is represented as a circle of infinitesimal thickness having teeth 1a, 1b, etc., on its periphery, the bounding edges of which are cutting edges. It is indicated as rotating about its axis in the direction of the arrows A (Figs. 1 and 3) in a position to mesh with the teeth of a gear 2, rotating in the direction of arrows B in a plane inclined to the plane of the tool, according to the usual practice in gear shaving. If it be assumed that such a tool could be made and could be caused to perform a controlled cutting action, and if it were fed or advanced in a curved path such as that represented at C in Figs. 4 and 5, it would crown the work gear teeth. The axes of tool and work are at a minimum distance apart when the feeding movement begins. As feeding progresses, the center distance is increased until it becomes a maximum when the tool is at some point between the ends of the work gear, and thereafter the center distance is progressively decreased to the end of the feeding stroke. Cutting performed when the distance between the axes is less causes the teeth of the work gear to be thinner than at the points where cutting is performed with a greater distance between the axes, producing sides which are convex in intersecting planes parallel to the axis of the gear, as shown in Figs. 6 and 7. The foregoing description sets forth an ideal condition in that the tool described is free from tooth interference with the work and therefore capable of being transported in any path necessary to obtain desired results. It is wholly imaginary and impossible of actual attainment, and is given here simply to show the result which it is the object of this invention to obtain by commercially practicable means.

The commercial shaving cutters have substantial axial extent, with lands in their tooth faces between their cutting edges, as is illustrated by the sectional view of two teeth shown in Fig. 18, for controlling the tooth action and maintaining mesh with the work gear at the ends of the relative reciprocative travel. The section represented here is taken approximately on the pitch circumference of the cutter. These teeth are designated $t$ and $t'$. Grooves $g$ are formed in the sides of the teeth, the intersections of which with the side faces form cutting edges $e$, and the segments of the tooth faces between the edges form the lands $l$. Such tools are made both as spur gears and as helical gears. In the case of spur type cutters the longitudinal elements of opposite tooth faces are parallel, and in the case of helical cutters the corresponding elements are helices of equal helix angles, so that the teeth in all planes parallel to the axis which intersect both side faces are of uniform thickness from end to end (disregarding the grooves). Thus, when the cutter is transported in the path D, corresponding to the path C of the preceding description, only the advancing ends of the teeth $t$ and $t'$ cut while the distance between the axes is increasing, giving a crowning effect to the end of the work gear tooth $wt$, which is first attacked, as shown by Fig. 19. But when the distance between the axes is shortened, with further progress of the axial feed, edges of the tool teeth following the advancing ends come into action and cut away the sides of the teeth $wt$, largely destroying the initial crowning effect.

In the method of my invention I employ a tool 3 of which the teeth $t^3$ and $t^4$ are themselves crowned or longitudinally convex in their opposite side faces, while being provided with intersecting grooves $g$ and cutting edges $e$ and having lands $l$ between the grooves. Cutters having teeth of this character are described and claimed in the patents referred to in the introductory part of this specification. The cutter and work are fed one relatively to the other longitudinally of the work gear axis accompanied by progressive increase and subsequent progressive decrease in the distance between their axes to accomplish the effect of moving the cutter in the path diagrammatically represented at E in Figs. 10 and 11.

At the same time the tool and work gear are run together in the manner of a pair of gears, with driving power applied to one of them and transmitted to the other by the action of their meshing teeth; and a relative lengthwise slide or slip of the contacting teeth is effected, as usual, by locating the tool and work gear with their axes crossed, but not intersecting, whereby rotation causes their meshing teeth to revolve in divergent planes, or it may be accomplished by any other suitable means. Successive edges back from the leading ends of the cutter teeth come into action with progress of the axial component of feed, and a number of them may be cutting simultaneously, (Fig. 12). As the feed progresses, with progressive separation between tool and gear until the axes are at the maximum distance apart, the situation illustrated in Figs. 10 and 13 occurs. Then the thicker mid length portions of the cutter teeth come into action, but at greater distances from the cutter axis such that their thickness through the points which make contact with the work is, in effect, diminished. (For example, the thickest part of tooth $t^3$ at its intersection with line 13—13 of Fig. 10 is thinner than a relatively thin part of the same tooth at the intersection with line 12—12 of Fig. 9; both lines being at the same distance from the gear axis but line 13—13 being farther from the cutter axis than line 12—12.) Thus full prescribed thickness may be left in the mid length of the gear teeth nothwithstanding the thinning of their ends.

Toward the end of this traverse, shown in Figs. 11 and 14, while the axes are approaching one another and until the position of minimum distance is reached, cutting edges in the trailing portions of the cutter teeth, where the thickness of the teeth and distance between corresponding edges in opposite sides is less than in mid portion (but the distance from the cutter axis is constantly being shortened so that edges of flanking cutter teeth approach more closely the work gear teeth between them), come into action on the rear end portions of the work gear teeth, reducing the thickness of such portions progressively, without affecting the maximum tooth thickness. At the conclusion of the movements just described, the axial traverse may be, and usually is, reversed and the cutter is passed back and forth a number of times, with like retraction and advance between the axes of cutter and work during each passage, until the gear teeth are brought to the prescribed finished form and dimensions.

In Figs. 12, 13 and 14 the crowned formation of the cutter teeth is shown with exaggeration to make this characteristic plainer. And in these and other figures the crowning of the work gear teeth is exaggerated for the same purpose. In commercial work it is usually unnecessary to have the crowning so pronounced in either; but it is possible. The invention enables any desired and useful degree of crowning to be obtained during the process of finishing a gear by shaving and without sacrificing the accuracy of the thickness dimension in the thickest part of the teeth. Both ends of the teeth can be equally diminished in thickness.

The foregoing description implies that both the translative feed movements and the movements which cause change of distance between the axes are imparted to the tool. This is not an essential or limiting factor, for both movements may be given to the work gear, or either movement to the cutter and the other to the gear, or fractions of either or both movements to both the cutter and gear.

In Fig. 21 I have shown the principles of a machine capable of carrying out the steps of the method. In this machine a base 10 supports a carriage 11 on its top surface and a work support 12 on one side. The carriage is guided by ways to move rectilinearly toward and away from the work support and carries an angularly adjustable turret 13 in which a spindle 14 is mounted to protrude over the upper end of the work support. The cutter 3 may be secured on the protruding end of said spindle.

On the top of the work support 12 is mounted a holder 15 having means for rotatably supporting a work piece 2 in mesh with the cutter 3, whether the axis of the latter is placed by adjustment of the turret parallel to the work axis or in crossed relation thereto.

The spindle 14 is driven rotatably by a motor 16 through suitable driving connections. The carriage is reciprocated by a shaft 17 through a crank 18 and connecting rod 19. The work support 12 rests on a cam 20 and is raised and lowered thereby in timed relation to the reciprocations of the carriage 11. The cam may have the outline shown in Fig. 22 with descending and rising surfaces suitably disposed to lower and then raise the work holder during the progress of the cutter from one end of the work piece to the other. It is mounted on a shaft 21 which is driven simultaneously with shaft 17 by a motor, not shown, at a suitable speed ratio with the shaft. It is unnecessary to describe the details of the machine further in this specification, as such machine is fully explained in my prior copending application filed June 19, 1936, Serial No. 86,089, Patent 2,280,045, April 14, 1942, of which the present application is a division.

What I claim and desire to secure by Letters Patent is:

1. The method of finishing gears and crowning the teeth thereof by shaving, which comprises meshing a shaving tool having bowed teeth increasing in thickness from both ends toward their mid-length portion and cutting edges in the sides of such teeth, with a work gear and running them together in mesh with a component of relative cutting traverse between their contacting teeth such that the cutting edges of the tool are caused to shave the surfaces of the work gear teeth, producing a relative feeding traverse between the tool and work gear in the direction of the axis of the gear, effecting a relative recession between the axes of tool and work while the portions of the tool teeth which have progressively increasing thickness are entering into action with the work, and effecting a relative approach between such axes while the portions of the tool teeth of diminishing thickness are approaching the rear end of the work piece.

2. The method of finishing and crowning the teeth of gears by shaving which consists in providing a tool having teeth in the form of gear teeth with oppositely bowed side faces of longitudinally convex curvature and a succession of cutting edges in such bowed faces between the ends of the teeth, bringing the edges adjacent to one end of said teeth into engagement with the teeth of a gear to be finished, at and adjacent to one end of said teeth while the other ends of the gear teeth protrude outwardly from the tool teeth, rotating the tool and gear in meshing engagement with sufficient pressure between them to cause cutting of the gear teeth by said edges while causing a relative traverse between said edges and gear teeth lengthwise of the gear teeth, effecting a relative feeding traverse between the tool and gear lengthwise of the axis of the gear, and simultaneously relatively displacing the tool and gear in a manner to cause edges of the tool teeth more remote from the forward ends thereof to act on the gear teeth at distances which are progressively increasing and then progressively decreasing from the longitudinal radial mid planes of the gear teeth.

3. The method of finishing and crown gear teeth by shaving which consists in putting the gear to be finished into mesh at one end with one end of a shaving tool having teeth of conjugate form to the gear and of which the opposite sides are longitudinally curved with convex curvature, said teeth having spaced apart grooves and cutting edges in such sides, rotating the tool and gear in mesh under pressure and at the same time causing a relative cutting traverse of the tool edges lengthwise of the gear teeth, producing a gradual feed movement between the tool and gear lengthwise of the axis of the latter, and at the same time increasing and then decreasing the distance between the axes of the gear and tool progressively in a manner to cause thinning of the gear teeth at one end by the advancing portions of the tool teeth, and thinning of the gear teeth at the opposite end by the progressively thinner trailing portions of the tool teeth.

4. The method of simultaneously finishing and crowning the teeth of a gear, which consists in placing such gear in mesh with a gear-like tool having teeth conjugate to the gear and of which the teeth are longitudinally curved at both sides so that their ends are thinner than their mid-length portions, and such teeth have cutting edges spaced apart from one another in their side faces, rolling the tool and gear with pressure contact between their teeth while causing a relative cutting traverse between them, effecting relative feeding movement between the tool and gear lengthwise of the tool, and altering the distance between the axes of the gear and tool at times during the progress of said feeding movement such that the advancing portions of the tool teeth are brought to bear on the forward end portions of the gear teeth, and the trailing parts of the tool teeth on the rear end portions of the gear teeth, at points nearest together than the corresponding distances between intermediate portions of the gear teeth which are acted upon by intermediate portions of the tool teeth.

5. The method of crowning and finishing the teeth of a gear at one and the same time, which consists in running such gear in pressure mesh with a tool having gear teeth conjugate to those of the work gear, and of which the opposite side faces of the teeth are longitudinally bowed with convex curvature and are intersected by grooves forming cutting edges at the intersections with such side faces, applying driving torque to one only of the meshing pair constituted by the tool and gear, whereby the other member of the pair is rotated by its meshing engagement with the driven member, causing a relative slip to take place between the engaging teeth of the tool and gear lengthwise of the gear teeth, whereby said cutting edges are caused to scrape the surfaces of the gear teeth, relatively translating the tool and gear lengthwise of the gear axis from a position wherein the coacting teeth are meshed at their advancing end portions only to a position in which such teeth are in mesh at their trailing end portions only, enlarging the distance between the axes of the tool and work during the first part of such translation while the parts of the tool teeth of increasing thickness are coming into engagement with the gear, and shortening such distance progressively after the thickest parts of the tool teeth have passed the mid-length of the gear teeth.

6. The method of finishing gear teeth with crowning effect by shaving, which consists in employing a shaving tool having crowned teeth with less thickness at their ends than at the portions between their ends, running such tool and the gear to be crowned with pressure contact between their mating teeth, effecting relative reciprocating movement between the cutter and gear axially of the gear and effecting relative gradual separation and approach between the cutter and gear during the progress of such reciprocation in each direction through distances such that during the first part of each relative axial traverse thinner parts of the increasing thickness of the cutter teeth are located in cutting relation to the work, and during the last part of such traverse thicker sections of the relatively thinner trailing ends of the cutter teeth are brought into cutting engagement.

7. The method of shaving and crowning gears at the same time, which consists in selecting a shaving cutter having teeth which are longitudinally bowed with convex curvature on both sides, running such cutter and a gear to be finished in mesh together, effecting relative traverse between the cutter and gear in the direction of the axis of the gear, increasing the distance between the axes of cutter and gear progressively during the first part of such relative traverse in each direction through distances such that when the thicker mid-length portions of the tool occupy the middle portion of the relative axial traverse, the section of the tool teeth which actually engages the gear is of less width than the section on which the narrower ends of the cutter made contact with the gear at the commencement of such traverse; and during the final stages of the traverse, progressively thicker sections of the diminishing width trailing ends of the cutter teeth come into contact with the gear.

8. The method of crowning gears, which consists in running the gear in mesh with a shaving tool of which the teeth are longitudinally bowed with convex curvature on opposite sides, producing relative reciprocation between the cutter and gear in the axial direction of the gear, increasing the distance between the axes of cutter and gear during the first part, and diminishing such distance during the last part, of each relative traverse, and causing the approach to occur at rates such that progressively thicker sections of the progressively thinner trailing ends of the cutter teeth are brought into contact with the gear.

EDWARD W. MILLER.